United States Patent
Yamaguchi

(10) Patent No.: US 9,714,311 B2
(45) Date of Patent: Jul. 25, 2017

(54) METHOD FOR PRODUCING HOLLOW POLYMER PARTICLE

(71) Applicant: ZEON CORPORATION, Tokyo (JP)

(72) Inventor: Atsushi Yamaguchi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 14/965,518

(22) Filed: Dec. 10, 2015

(65) Prior Publication Data

US 2016/0264750 A1 Sep. 15, 2016

(30) Foreign Application Priority Data

Mar. 12, 2015 (JP) ................................. 2015-048921

(51) Int. Cl.
*C08F 265/06* (2006.01)
*C08F 220/14* (2006.01)
*B01J 13/14* (2006.01)

(52) U.S. Cl.
CPC ............. *C08F 265/06* (2013.01); *B01J 13/14* (2013.01); *C08F 220/14* (2013.01)

(58) Field of Classification Search
CPC ........ B01J 13/02; C08F 220/14; C08F 265/06
See application file for complete search history.

(56) References Cited

U.S. PATENT DOCUMENTS

| 2006/0063001 A1* | 3/2006 | Hart et al. ............. | A01N 43/80 428/402.2 |
| 2007/0215000 A1* | 9/2007 | Reybuck et al. ....... | A01N 43/80 106/18.33 |
| 2009/0087662 A1* | 4/2009 | Yoshitani et al. ........ | C08F 2/24 428/407 |

FOREIGN PATENT DOCUMENTS

| JP | 2005-179493 A | 7/2005 |
| JP | 2009-120784 A | 6/2009 |

* cited by examiner

*Primary Examiner* — Nathan M Nutter
(74) *Attorney, Agent, or Firm* — Oliff PLC

(57) ABSTRACT

A hollow polymer particle includes a structure body that contains a structure including (1) a core polymer formed by copolymerizing a monomer mixture (a) consisting of 20 to 60% by weight of an acid group-containing monomer and 80 to 40% by weight of another monomer that is copolymerizable with the acid group-containing monomer and (2) a shell polymer formed by copolymerizing a monomer mixture (b) consisting of 0 to 15% by weight of an acid group-containing monomer and 100 to 85% by weight of another monomer that is copolymerizable with the acid group-containing monomer so that the shell polymer substantially surrounding the core polymer. The structure body has at least one void formed by neutralization of at least one portion of an acid group contained in the core polymer. The hollow polymer particle is obtained by adding a preservative during a time period after formation of the core polymer and before formation of the shell polymer.

1 Claim, No Drawings

METHOD FOR PRODUCING HOLLOW POLYMER PARTICLE

CROSS-REFERENCE TO RELATED APPLICATION

The disclosure of the following priority application is herein incorporated by reference:
Japanese Patent Application No. 2015-048921, filed on Mar. 12, 2015.

TECHNICAL FIELD

The present invention relates to a hollow polymer particle, an aqueous dispersion thereof, and a method for producing the hollow polymer particle. More specifically, the present invention relates to a hollow polymer particle having high storage stability, a small amount of aggregates, and a high porosity, to an aqueous dispersion thereof, and to a method for producing such hollow polymer particle.

BACKGROUND ART

Hollow polymer particles are generally used in applications such as water-based paints and paper coating compositions as masking agents. Hollow polymer particles are also used as organic pigments having good optical properties in terms of opacity, whiteness, and the like due to higher light diffusivity, and hence, lower light transmittance, compared to polymer particles that are densely and uniformly filled with polymer.

In such applications, it is desired that a hollow polymer particle to be used possess an increased porosity to reduce the weight of paint, coated paper, or the like, and improved heat insulation and opacification. Further, a hollow polymer particle is also desired to have a small amount of aggregates, and to have higher polymerization stability, which permits such a hollow polymer particle having a high porosity to be efficiently and stably produced.

For example, Patent Literature 1 discloses that a hollow polymer particle having a high porosity is efficiently and stably obtained by performing production of a hollow polymer particle in the presence of a chain transfer agent.

Here, a hollow polymer particle is usually stored in a tank, a drum can, an 18-liter can, or the like after production. However, depending on production conditions of the hollow polymer particle, a problem may arise with respect to storage stability in that, for example, fungi may grow during storage, and emit unpleasant odor.

Patent Literature 2 discloses that a composition of a hollow polymer particle is produced by adding a predetermined amount of 2-methyl-4-isothiazolin-3-one and a predetermined amount of 2-n-octyl-4-isothiazolin-3-one to the hollow polymer particle, after production of the hollow polymer particle.

However, if preservatives are added after production of the hollow polymer particle as disclosed in Patent Literature 2, a sufficient degree of polymerization stability has not been achieved due to difficulties in lowering aggregates sufficiently. Moreover, in some cases, storage stability of such hollow polymer particle is not high enough.

CITATION LIST

Patent Literature

Patent Literature 1: JP 2005-179493 A
Patent Literature 2: JP 2009-120784 A

SUMMARY OF INVENTION

Technical Problem

An object of the present invention is to provide a hollow polymer particle having high storage stability, high polymerization stability, and a high porosity, and an aqueous dispersion of such hollow polymer particle. Further, an object of the present invention is also to provide a method for producing such hollow polymer particle.

Solution to Problem

As the result of extensive research to solve the problems described above, the present inventor has found that addition of a preservative at a particular timing can solve the problems described above. Thus, the present invention has been made.

That is, the present invention provides:
(I) a hollow polymer particle including a structure body that contains a structure including (1) a core polymer formed by copolymerizing a monomer mixture (a) consisting of 20 to 60% by weight of an acid group-containing monomer and 80 to 40% by weight of another monomer that is copolymerizable with the acid group-containing monomer, and (2) a shell polymer formed by copolymerizing a monomer mixture (b) consisting of 0 to 15% by weight of an acid group-containing monomer and 100 to 85% by weight of another monomer that is copolymerizable with the acid group-containing monomer so that the shell polymer substantially surrounding the core polymer, wherein the structure body has at least one void formed by neutralization of at least one portion of an acid group contained in the core polymer, and the hollow polymer particle is obtained by adding a preservative during a time period after formation of the core polymer and before formation of the shell polymer;
(II) an aqueous dispersion of the hollow polymer particle of (I); and
(III) a method for producing a hollow polymer particle, the method including a core polymer formation step of forming a core polymer by copolymerizing a monomer mixture (a) consisting of 20 to 60% by weight of an acid group-containing monomer and 80 to 40% by weight of another monomer that is copolymerizable with the acid group-containing monomer, a shell polymer formation step of forming a shell polymer by copolymerizing a monomer mixture (b) consisting of 0 to 15% by weight of an acid group-containing monomer and 100 to 85% by weight of another monomer that is copolymerizable with the acid group-containing monomer so that the shell polymer covers the core polymer, a base treatment step of neutralizing the core polymer, and a step of adding a preservative, wherein the step of adding a preservative is conducted during a time period after the core polymer formation step and before the shell polymer formation step.

Advantageous Effects of Invention

According to the present invention, a hollow polymer particle having high storage stability, high polymerization stability, and a high porosity, and an aqueous dispersion of such hollow polymer particle are provided. Further, a method for producing such hollow polymer particle is also provided.

DESCRIPTION OF EMBODIMENTS

Hereinafter, a hollow polymer particle according to the present invention will be described. A hollow polymer particle according to the present invention is a hollow polymer particle including a structure body that contains a structure including (1) a core polymer formed by copolymerizing a monomer mixture (a) consisting of 20 to 60% by weight of an acid group-containing monomer and 80 to 40% by weight of another monomer that is copolymerizable with the acid group-containing monomer, and (2) a shell polymer formed by copolymerizing a monomer mixture (b) consisting of 0 to 15% by weight of an acid group-containing monomer and 100 to 85% by weight of another monomer that is copolymerizable with the acid group-containing monomer so that the shell polymer substantially surrounding the core polymer, wherein the structure body has at least one void formed by neutralization of at least one portion of an acid group contained in the core polymer. The hollow polymer particle is obtained by adding a preservative during a time period after formation of the core polymer and before formation of the shell polymer.

(Core Polymer)

The core polymer is obtained by copolymerizing a monomer mixture (a) consisting of 20 to 60% by weight, preferably 30 to 50% by weight, of an acid group-containing monomer, and 80 to 40% by weight, preferably 70 to 50% by weight, of another monomer that is copolymerizable with the acid group-containing monomer.

When an amount of the acid group-containing monomer is equal to or larger than the lower limit, it is capable of preventing a phenomenon that a base hardly penetrates into a polymer particle during a base treatment step, and thus a void is hardly formed in the polymer particle. Further, when the amount of the acid group-containing monomer is equal to or smaller than the upper limit, it is capable of preventing a phenomenon that the core polymer easily moves to outside of the shell polymer, so that stability during polymerization or the base treatment step is reduced, and thus the amount of generated aggregates is increased.

An acid group-containing monomer used in the present invention is a monomer having a functional group showing an acidic property. Specific examples thereof include ethylenically unsaturated monocarboxylic acids such as acrylic acid, methacrylic acid, crotonic acid, cinnamic acid, and the like; ethylenically unsaturated polyvalent carboxylic acids such as itaconic acid, fumaric acid, maleic acid, butene tricarboxylic acid, and the like; partially esterified compounds of an ethylenically unsaturated polyvalent carboxylic acid such as monoethyl itaconate, monobutyl fumarate, monobutyl maleate, and the like; sulfonic acid group-containing monomers such as styrenesulfonic acid; and the like. These acid group-containing monomers can be used alone or in combination of two or more kinds thereof.

Among them, by selecting acids having suitably high hydrophilicity, localization of the acid group(s) in an outer region of a polymer particle is prevented. This facilitates covering of the core polymer by the shell polymer, and thus facilitates formation of a void in the polymer particle. Among these acid group-containing monomers, ethylenically unsaturated monocarboxylic acids are preferred, and methacrylic acid is more preferred.

Examples of the another monomer that is copolymerizable with the acid group-containing monomer include aromatic vinyl monomers, such as styrene, α-methylstyrene, p-methylstyrene, halogenated styrenes, and the like; ethylenically unsaturated carboxylic acid ester monomers, such as methyl (meth)acrylate, ethyl (meth) acrylate, butyl (meth) acrylate, 2-ethylhexyl (meth)acrylate, lauryl (meth)acrylate, glycidyl (meth)acrylate, 2-hydroxyethyl (meth)acrylate, and the like; ethylenically unsaturated carboxylic acid amide monomers, such as (meth)acrylamide, N-methylol (meth) acrylamide, N-butoxymethyl (meth)acrylamide, and the like; conjugated diene monomers, such as butadiene, isoprene, and the like; carboxylic acid vinyl ester monomers, such as vinyl acetate, and the like; halogenated vinyl monomers, such as vinyl chloride, and the like; halogenated vinylidene monomers, such as vinylidene chloride, and the like; vinylpyridine; and the like. Among these monomers, ethylenically unsaturated carboxylic acid ester monomers are preferred. These monomers can be used alone or in combination of two or more kinds thereof.

Further, a crosslinkable monomer, such as, for example, divinyl benzene, diallyl phthalate, allyl (meth)acrylate, and ethylene glycol di(meth)acrylate, may be blended with the monomer mixture (a) as needed. However, since use of a large amount of a crosslinkable monomer creates difficulties in void formation, the used amount is preferably within a range that ensures stable void formation. The content ratio of a crosslinkable monomer in the monomer mixture (a) is preferably 20% by weight or less, more preferably 10% by weight or less, and still more preferably 1% by weight or less.

Copolymerization of the monomer mixture (a) is usually conducted in an aqueous medium. Thus, the core polymer obtained by copolymerization is usually obtained in a form of an aqueous dispersion. The aqueous medium is usually water. A water-soluble organic solvent, such as methanol or ethanol, may also be used together as long as dispersion stability of the polymer particles is not adversely affected during production. The used amount of the aqueous medium is usually 100 to 1000 parts by weight, preferably 200 to 600 parts by weight, with respect to 100 parts by weight of the monomer mixture (a). By ensuring the used amount of the aqueous medium equal to or more than the lower limit, the amount of aggregates generated during polymerization can be reduced, and by ensuring the used amount of the aqueous medium equal to or less than the upper limit, the productivity of the hollow polymer particle is improved.

A polymerization method to form the core polymer is usually emulsion polymerization. However, the core polymer may be formed in such a manner that a polymer obtained by another polymerization method is converted into an aqueous dispersion that contains the core polymer using a phase inversion method.

A polymerization process may also be either a batch type, a semi-continuous type, a continuous type, or the like. Further, a polymerization temperature is not particularly limited, and it may be either low or high. Further, a polymerization pressure and a polymerization time are not particularly limited, and known conditions are adopted.

Further, in addition to the monomer mixture (a), various known additives such as, for example, various emulsifiers, polymerization initiators, chelating agents, electrolytes, and surfactants can be used as subsidiary materials for polymerization during formation of the core polymer.

Further, the core polymer is preferably formed by polymerization using a seed. Use of a seed permits the particle size of the core polymer produced to be easily controlled. A composition of a seed is not particularly limited.

The polymerization conversion ratio of the monomer mixture (a) in a polymerization reaction is usually 90% by weight or more, and preferably 97% by weight or more. The composition of the copolymer to be produced is approximately the same as the composition of the monomer mixture (a).

The volume average particle size of the particles of the core polymer is preferably 100 to 600 nm, and more preferably 250 to 400 nm. By ensuring the particle size equal to or greater than the lower limit, a hollow polymer particle having a high porosity and a large particle size tends to be easily produced. In contrast, by ensuring the particle size equal to or less than the upper limit, the core polymer is easily covered by the shell polymer, and thus a void tends to be easily formed in the hollow polymer particle.

A radial distribution of acid group-containing monomer units in the core polymer particle is not particularly limited. Copolymerization may be performed in such a manner that the monomer mixture is added to the polymerization reaction system with the composition of the monomer mixture being sequentially changed. If such a polymerization method results in a radial distribution of the content of the acid group-containing monomer units in the core polymer particle, it is preferable that a portion having the least acid group-containing monomer units contains the acid group-containing monomer units with a content of 10% by weight or more, and preferably 15% by weight or more, with respect to all the monomer units that form that portion. This content ratio less than 10% by weight may result in generation of small particles in a void of the hollow polymer particle, causing a decrease in the porosity.

(Preservative)

In the present invention, a preservative is added during a time period after formation of the core polymer and before formation of the shell polymer. Addition of a preservative during a time period after formation of the core polymer and before formation of the shell polymer can effectively suppresses growth of fungi. This can prevent generation of unpleasant odor and the like in a composition such as the aqueous dispersion of the hollow polymer particle and the like, and thus provides high storage stability.

As used herein, the phrase "after formation of the core polymer" is intended to mean any time after the polymerization reaction of the monomer mixture (a) is almost complete and formation of the core polymer is thus almost complete; the phrase "before formation of the shell polymer" is intended to mean any time generally before the polymerization reaction of the monomer mixture (b) for forming the shell polymer described below is started. Note that, the addition does not necessarily need to be completely finished before the start of the polymerization reaction.

According to the present invention, the timing of adding a preservative is not particularly limited except that the preservative is added during a time period after formation of the core polymer and before formation of the shell polymer as described above. The preservative may be added at one time or in a sequential manner during this period; however, it is preferred that the addition treatment be complete immediately after formation of the core polymer for achieving high storage stability of the hollow polymer particle to be obtained.

Further, according to the present invention, addition of a preservative during a time period after formation of the core polymer and before formation of the shell polymer as described above can effectively suppress growth of fungi on the core polymer and in the aqueous dispersion of the core polymer even when there is a long time period between the completion of formation of the core polymer and the beginning of formation of the shell polymer.

Examples of the preservative include isothiazolin-based compounds. Isothiazolin-based compounds can be expressed, in general, by the structural formula (1) shown below:

{Chem. 1}

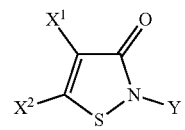

(1)

(In the formula, Y represents hydrogen or a hydrocarbon group which may be substituted; and $X^1$ and $X^2$ each represent hydrogen, halogen, or an alkyl group having from 1 to 6 carbon atoms. Note that, $X^1$ and $X^2$ may together form an aromatic ring. Note that, $X^1$ and $X^2$ may be the same or different from each other.)

An isothiazolin-based compound expressed by the structural formula (1) shown above will be described first.

In the structural formula (1) shown above, Y represents hydrogen or a hydrocarbon group which may be substituted. Examples of a substituent of the hydrocarbon group which may be substituted represented by Y include a hydroxyl group, halogen (e.g., chlorine, fluorine, bromine, iodine, and the like), a cyano group, an amino group, a carboxyl group, an alkoxy group having from 1 to 4 carbon atoms (e.g., a methoxy group, an ethoxy group, and the like), an aryloxy group having from 6 to 10 carbon atoms (e.g., a phenoxy group, and the like), an alkylthio group having from 1 to 4 carbon atoms (e.g., a methylthio group, an ethylthio group, and the like), an arylthio group having from 6 to 10 carbon atoms (e.g., a phenylthio group, and the like), and the like. Among the substituents, a halogen atom and an alkoxy group having from 1 to 4 carbon atoms are preferred. The hydrocarbon group may have 1 to 5, preferably 1 to 3, hydrogen atoms substituted by these substituents. Further, these substituents may be the same or differ.

Examples of the hydrocarbon group of the hydrocarbon group which may be substituted represented by Y include an alkyl group having from 1 to 10 carbon atoms, an alkenyl group having from 2 to 6 carbon atoms, an alkynyl group having from 2 to 6 carbon atoms, a cycloalkyl group having from 3 to 10 carbon atoms, and an aryl group having from 6 to 14 carbon atoms. Among the hydrocarbon groups, an alkyl group having from 1 to 10 carbon atoms, and a cycloalkyl group having from 3 to 10 carbon atoms are preferred, and an alkyl group having from 1 to 10 carbon atoms is more preferred.

Examples of the alkyl group having from 1 to 10 carbon atoms include a methyl group, an ethyl group, a propyl group, an isopropyl group, a butyl group, an isobutyl group, a sec-butyl group, a tert-butyl group, a pentyl group, a hexyl group, a heptyl group, an octyl group, an isooctyl group, a sec-octyl group, a tert-octyl group, a nonyl group, and a decyl group. Among them, an alkyl group having from 1 to 3 carbon atoms such as, for example, a methyl group and an ethyl group, and an alkyl group having from 7 to 10 carbon atoms such as, for example, an octyl group and a tert-octyl group are preferred, and an alkyl group having from 1 to 3 carbon atoms is more preferred.

Examples of the alkenyl group having from 2 to 6 carbon atoms include a vinyl group, an allyl group, an isopropenyl group, 1-propenyl group, 2-propenyl group, and 2-methyl-1-propenyl group. Among the alkenyl group, a vinyl group and an allyl group are preferred. Examples of the alkynyl group having from 2 to 6 carbon atoms include an ethynyl group, 1-propynyl group, 2-propynyl group, a butynyl group, and a pentynyl group. Among the alkynyl group, an ethynyl group and a propynyl group are preferred.

Examples of the cycloalkyl group having from 3 to 10 carbon atoms include a cyclopropyl group, a cyclobutyl group, a cyclopentyl group, a cyclohexyl group, a cycloheptyl group, and a cyclooctyl group. Among the cycloalkyl group, a cyclopentyl group and a cyclohexyl group are preferred.

Examples of the aryl group having from 6 to 14 carbon atoms include a phenyl group, a naphthyl group, an anthryl group, and a phenanthryl group. Among the aryl group, a phenyl group is preferred.

As described above, while various candidates can be exemplified as the hydrocarbon group which may be substituted represented by Y, among the hydrocarbon group, a methyl group and an octyl group are more preferred, and a methyl group is still more preferred.

In the structural formula (1) shown above, $X^1$ and $X^2$ represent the same or different hydrogen, halogen, or an alkyl group having from 1 to 6 carbon atoms.

Examples of the halogen include fluorine, chlorine, bromine, or iodine. Among them, chlorine is preferred.

Examples of the alkyl group having from 1 to 6 carbon atoms include a methyl group, an ethyl group, a propyl group, an isopropyl group, a butyl group, an isobutyl group, a sec-butyl group, a tert-butyl group, and a pentyl group. Among the alkyl group, an alkyl group having from 1 to 4 carbon atoms such as, for example, a methyl group, an ethyl group, and a propyl group are preferred. Among the substituents described above, $X^1$ is preferably hydrogen or chlorine, and more preferably chlorine. Further, $X^2$ is more preferably hydrogen or chlorine, and still more preferably hydrogen.

Specific examples of an isothiazolin-based compound expressed by the structural formula (1) shown above include 5-chloro-2-methyl-4-isothiazolin-3-one, 2-methyl-4-isothiazolin-3-one, 2-ethyl-4-isothiazolin-3-one, 2-n-octyl-4-isothiazolin-3-one, 4,5-dichloro-2-n-octyl-4-isothiazolin-3-one, 4,5-dichloro-2-cyclohexyl-4-isothiazolin-3-one, 5-chloro-2-ethyl-4-isothiazolin-3-one, and 5-chloro-2-t-octyl-4-isothiazolin-3-one.

Among these compounds, 5-chloro-2-methyl-4-isothiazolin-3-one (hereinafter also referred to as "CIT"), 2-methyl-4-isothiazolin-3-one (hereinafter also referred to as "MIT"), 2-n-octyl-4-isothiazolin-3-one (hereinafter also referred to as "OIT"), and 4,5-dichloro-2-n-octyl-4-isothiazolin-3-one are preferred; and CIT, MIT, and OIT are more preferred.

The structural formula (2) shown below represents compounds in which $X^1$ and $X^2$ of the structural formula (1) shown above together form an aromatic ring, and that aromatic ring is a benzene ring:

{Chem. 2}

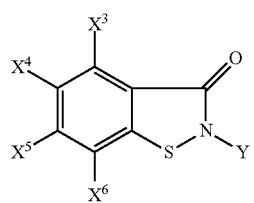

(2)

(In the formula, Y is the same as that of the structural formula (1); and $X^3$ to $X^6$ each represent hydrogen, halogen, a hydroxyl group, a cyano group, an amino group, a carboxyl group, an alkyl group having from 1 to 4 carbon atoms, or an alkoxy group having from 1 to 4 carbon atoms.)

In the structural formula (2) shown above, $X^3$ to $X^6$ may each be, for example, hydrogen, a hydroxyl group, halogen (e.g., chlorine, fluorine, bromine, iodine, and the like), a cyano group, an amino group, a carboxyl group, an alkyl group having from 1 to 4 carbon atoms (e.g., a methyl group, an ethyl group, a propyl group, and the like), an alkoxy group having from 1 to 4 carbon atoms (e.g., a methoxy group, an ethoxy group, and the like), or the like. Among them, halogen, and an alkyl group having from 1 to 4 carbon atoms are preferred. $X^3$ to $X^6$ may be the same or differ.

Examples of an isothiazolin-based compound expressed by the structural formula (2) shown above include 1,2-benzoisothiazolin-3-one (hereinafter also referred to as "BIT"), and N-methyl-1,2-benzisothiazolin-3-one.

These isothiazolin-based compounds may be used alone or in combination of two or more kinds thereof. Among the isothiazolin-based compounds, MIT, OIT, CIT, and BIT are more preferred, and combinations of MIT and at least one of OIT, CIT, and BIT are particularly preferred.

Note that, the isothiazolin-based compounds may be used alone or in combination of two or more kinds thereof at any blending ratio.

The preservative is used in a ratio of preferably 0.0001 to 0.1 parts by weight, and more preferably 0.001 to 0.05 parts by weight, with respect to 100 parts by weight of the core polymer. When the amount of the preservative is equal to or larger than the lower limit, it is capable of preventing a phenomenon that storage stability of a hollow polymer particle composition such as the aqueous dispersion of the hollow polymer particle is decreased due to failure to suppress growth of fungi in the hollow polymer particle. An excessively high used amount of the preservative would not provide a higher preservative effect than an expected degree.

(Shell Polymer)

The shell polymer substantially surrounds the core polymer. As used herein, the phrase "substantially surround(s)" may also refer to a structure in which a portion of the shell polymer is contained in the core polymer as long as it is possible to recognize a void after the base treatment. The shell polymer is formed, around the core polymer, by copolymerizing the monomer mixture (b) consisting of 0 to 15% by weight, preferably 1 to 12% by weight, and more preferably 3 to 9% by weight, of the acid group-containing monomer, and 100 to 85% by weight, preferably 99 to 88% by weight, and more preferably 97 to 91% by weight, of a monomer that is copolymerizable with the acid group-containing monomer in the presence of core polymer particles.

Note that, the shell layer formed of the shell polymer may be formed of a single polymer layer, or may be formed of a plurality of polymer layers. When a shell layer is formed of a plurality of polymer layers, a composition of each of the polymer layers is not particularly limited as long as each of the polymer layers meets the composition requirements described above.

When a content ratio of the acid group-containing monomer in the monomer mixture (b) is equal to or lower than the upper limit, it is capable of preventing a phenomenon that it is not possible to obtain the hollow polymer particle stably due to difficulty in controlling conditions in the base treatment step. To produce a hollow polymer particle having a high porosity more efficiently and stably, it is preferable that the monomer mixture (b) contains the acid group-containing monomer in the range described above.

Specific examples of the acid group-containing monomer that is added as needed for forming the shell polymer include monomers similar to those shown by indicating example as the acid group-containing monomer for use in forming the core polymer.

Further, specific examples of the another monomer that is copolymerizable with the acid group-containing monomer include monomers similar to those shown by indicating example as the another monomer that is copolymerizable for use in forming the core polymer.

In the present invention, it is preferable that no chain transfer agent be used in formation of the shell polymer from a viewpoint of preventing emission of unpleasant odor.

The weight ratio of the core polymer to the shell polymer (core polymer/shell polymer) ranges usually from 3/97 to 70/30, preferably from 5/95 to 50/50, and more preferably from 8/92 to 30/70.

By ensuring the ratio of the shell polymer equal to or less than the upper limit, a base easily penetrates into the polymer particle during the base treatment step, and thus a void tends to be easily formed in the polymer particle. Moreover, by ensuring the ratio of the shell polymer equal to or more than the lower limit, the core polymer is prevented from moving to outside of the shell polymer during the polymerization or the base treatment step, and thus a void tends to be easily formed.

The polymerization method to form the shell polymer is usually emulsion polymerization method, and may also be either a batch type, a continuous type, a semi-continuous type, or the like. Further, the polymerization conditions similar to those for the core polymer can be used. Further, known polymerization subsidiary materials can be used as subsidiary materials for polymerization that can be used for polymerization, similarly to the case of the core polymer.

(Base Treatment)

A hollow polymer particle according to the present invention includes at least one void formed by neutralization of at least one portion of the acid group contained in the core polymer of a polymer particle having a structure formed of at least two layers consisting of the core polymer and the shell polymer. For example, by adjusting a pH of the aqueous dispersion to 7 or more with addition of a base to the aqueous dispersion of the polymer particle, at least one void can be formed in the polymer particle (the void is filled with an aqueous solution that constitutes the aqueous dispersion).

The base can be a volatile base and/or a nonvolatile base.

Examples of a volatile base include ammonia, ammonium hydroxide, morpholine, trimethyl amine, and triethyl amine.

Examples of a nonvolatile base include alkali metal hydroxides, such as sodium hydroxide, potassium hydroxide, lithium hydroxide, and the like; alkaline earth metal hydroxides, such as calcium hydroxide, magnesium hydroxide, and the like; alkali metal (bi)carbonate, such as sodium carbonate, potassium bicarbonate, and the like; ammonium salts of (bi)carbonic acid, such as ammonium carbonate, ammonium bicarbonate, and the like; and other nonvolatile bases.

Among the bases, a volatile base can be preferably used, and ammonia and ammonium hydroxide can be more preferably used.

The base should be used in an amount such that at least one portion of an acid group of the core polymer will be neutralized to cause the aqueous dispersion containing the polymer particles to have a pH of 7 or more.

To neutralize at least one portion of an acid group of the core polymer by adding a base into the aqueous dispersion, it takes time for the base to diffuse into the polymer particle. Thus, ensuring sufficient stirring for an appropriate period of time after the addition of the base is desirable.

The base treatment is preferably performed at or above a temperature that permits the polymer particle to be sufficiently softened. The process time after the addition of the base is usually about 15 minutes to 90 minutes.

To prevent decrease in stability of the aqueous dispersion that may occur due to the addition of the base, an anionic surfactant and/or a nonionic surfactant may be added alone or in combination before the addition of the base.

During the base treatment step, the base may be added in the presence of an organic solvent in accordance with the method disclosed in JP H03-26724 A. Use of an organic solvent softens polymer particles, and thus facilitates diffusion of the base. Examples of the organic solvent include aromatic hydrocarbons, halogenated hydrocarbons, alcohols, ethers, ketones, and saturated carboxylic acid esters. The organic solvent is usually used in an amount ranging from 0.1 to 1000 parts by weight with respect to 100 parts by weight of the polymer particle. The organic solvent used can be removed by evaporation after the base treatment.

In the base treatment step, a polymerizable monomer may be allowed to exist instead of the organic solvent. The polymerizable monomer used is usually a monomer including no acid groups. The polymerizable monomer is used in an amount ranging usually from 1 to 20 parts by weight, and preferably from 2 to 10 parts by weight, with respect to 100 parts by weight of the polymer particle. The polymerizable monomer may be newly added, or excessively added during the formation of the shell polymer, and the base treatment may be performed after the polymerization reaction is terminated by adding a polymerization inhibitor, a reducing agent, or the like. The excess amount of the polymerizable monomer can be processed by initiating a polymerization reaction by adding a polymerization initiator or the like after the base treatment.

Forming the core polymer, adding the preservative, and forming the shell polymer, and the base treatment may be performed sequentially in a same reactor, or performed in such a manner that after any of these steps is performed in one reactor, the product of that step is transferred to another reactor, in which the next step is performed.

A number average particle size of the hollow polymer particle according to the present invention is usually 0.2 to 3 µm, preferably 0.4 to 2 µm, and more preferably 0.8 to 1.5 µm. This particle size is determined by measuring the maximum particle sizes of 200 particles of the hollow polymer particle using a transmission electron microscope, and simply averaging the measured values.

A porosity of the hollow polymer particle according to the present invention is usually 48 to 60%, and preferably 50 to 55%. Note that, the porosity is obtained in such a manner that the maximum particle size, and the maximum diameter of the void in, each of 200 particles of the hollow polymer particle are determined using a transmission electron microscope, and the porosities calculated from respective pairs of these values are simply averaged.

Further, an amount of the preservative contained in the hollow polymer particle to be obtained is preferably $1.0 \times 10\%^5$ parts by weight or more, and more preferably $1.0 \times 10^{-4}$ parts by weight or more, and is preferably less than $5.0 \times 10^{-2}$ parts by weight, and more preferably less than $5.0 \times 10^{-3}$ parts by weight, both with respect to 100 parts by weight of the hollow polymer particle.

Further, a content of aggregates contained in the aqueous dispersion of the hollow polymer particle according to the present invention is preferably 0.15% or less, more preferably 0.1% or less, and still more preferably 0.05% or less. Here, the content of aggregates refers to a ratio of an amount of aggregates to an amount of solids of the hollow polymer particle. The aggregates are obtained by filtering the aqueous dispersion of the hollow polymer particle through a 325-mesh wire net, and by drying the collected objects on the wire net.

The content of aggregates contained in the aqueous dispersion of the hollow polymer particle according to the present invention is low. Therefore, there is no need to remove the aggregates in the aqueous dispersion, or the filtering time to remove the aggregates is short. This provides high productivity. Moreover, a reduced frequency of cleaning process of the polymerization reactor(s) provides high workability.

A hollow polymer particle and an aqueous dispersion thereof according to the present invention can be used, for example, in an organic pigment, a light-scattering agent, or a light scattering auxiliary agent for use in coatings, paint, or the like on paper, ink, fabric, leather, and the like; a heat insulation layer of undercoat of heat-sensitive layer provided in heat-sensitive printing paper, in thermal transfer printing paper, and in heat-sensitive paper; an absorption filler for ink-jet printing paper, an internal filler used in a paper manufacturing process, a highly masking pigment for ink eraser or correction ribbon, a micro capsule material, and an intermediate material for toner for use in electronic photos; applications that utilize heat insulation properties of air, applications that utilize weight reduction due to air, such as weight reduction achieved by addition to resin, cement, concrete, and other materials, applications that utilize low dielectric properties of air by addition to a semiconductor sealing material and the like, and other applications. Among them, preferable applications include paper coating compositions. A paper coating composition is obtained by blending an inorganic pigment such as, for example, calcium carbonate, clay, barium sulfate, talc, titanium oxide, satin white, aluminum hydroxide, silica, and mica, with the aqueous dispersion of the hollow polymer particle according to the present invention. In addition, coated paper can be obtained by coating such a coating composition on base paper to form a surface coating layer. Moreover, since the coated paper obtained in such a manner contains the hollow polymer particle described above, the coated paper which has not only improved opacity but also high gloss can be produced. By utilizing the foregoing features, the coated paper described above can be preferably used in publications such as books, magazines, and the like, and in commercial prints such as leaflets, pamphlets, posters, and the like

EXAMPLES

Hereinafter, the present invention will be explained in more detail by indicating examples, but the present invention is not limited to these examples. Unless otherwise stated, "parts" cited in the examples below are based on weight.

Physical properties of the aqueous dispersion of the hollow polymer particle and the hollow polymer particle were measured as described below.

Storage Stability of Aqueous Dispersion of Hollow Polymer Particle 10 grams of a rotten aqueous dispersion of a hollow polymer particle without a preservative added and having $10^7$ colonies/ml or more of fungi was added to 100 grams of the aqueous dispersion of the hollow polymer particle obtained in each of Examples and Comparative Examples eight times with a week interval. A number of the fungi after 48 hours from the addition was measured, and evaluation was made. Note that, the number of the fungi was measured by counting the number of colonies after 48 hours of cultivation at a temperature of 30° C. using commercially available "Easicult TIC" (produced by Orion Diagnostica Oy, Finland). The evaluation criteria of storage stability were "good" for the number of colonies of the fungi of less than $10^3$ colonies/ml, "slightly poor" for that of $10^3$ to $10^4$ colonies/ml, and "poor" for that of more than $10^4$ colonies/ml.

Amount of Generated Aggregates of Aqueous Dispersion of Hollow Polymer Particle

An aqueous dispersion containing the hollow polymer particle of an amount equivalent to 150 grams of total solid content amount was filtered through a 325-mesh wire net. The residue on the wire net was washed by water, and was then dried at 105° C. for four hours. Thereafter, the percentage of dry weight of the residue on the wire net with respect to 150 grams of total solid content amount was calculated.

Porosity of Hollow Polymer Particle

The maximum particle size and the maximum diameter of the void in, each of 200 particles of the hollow polymer particle were determined using a transmission electron microscope. Then, the porosities calculated using the equation below were simply averaged to obtain the porosity of the hollow polymer particle.

$$\text{Porosity}=[(\text{maximum diameter of void})^3/(\text{maximum particle size})^3]\times 100(\%)$$

Example 1

(Formation of Core Polymer)

50 parts of methyl methacrylate (MMA), 10 parts of butyl acrylate (BA), 40 parts of methacrylic acid (MAA), 0.9 parts of sodium polyoxyethylene alkyl ether sulfate, 0.15 parts of sodium tripolyphosphate, and 80 parts of ion exchanged water were placed in a pressure vessel equipped with a stirrer, and were then stirred to prepare an emulsified product of the monomer mixture (a) for forming the core polymer.

Thereafter, 800 parts of ion exchanged water, 100 parts of MMA, 5 parts of sodium dodecylbenzene sulfonate, and 5 parts of potassium persulfate were added to a reaction vessel equipped with a stirrer, and were stirred. Then, the reaction vessel was heated to a temperature of 80° C. for polymerization reaction to obtain seed latex having a volume average particle size of 82 nm.

40 parts of ion exchanged water and 0.28 parts of the seed latex obtained (as a solid content) were added to a reaction vessel equipped with a stirrer. The reaction vessel was then heated to a temperature of 85° C. Then, 1.63 parts of an aqueous solution containing 3% by weight of potassium persulfate was added. Thereafter, an amount equivalent to 7% by weight of the total amount of the emulsified product of the monomer mixture (a) was continuously added to the reaction vessel for three hours, and then the reaction was performed for another one hour.

Then, 250 parts of ion exchanged water and 18.6 parts of an aqueous solution containing 3% by weight of potassium persulfate were added to the reaction vessel. Thereafter, the remainder of the emulsified product of the monomer mixture (a) was continuously added to the reaction vessel for three hours while the reaction temperature was maintained at 85° C., and then the reaction was performed for another two hours. The reaction vessel was then cooled to a room temperature to obtain an aqueous dispersion containing the core polymer. Note that, the polymerization conversion ratio was 99% or higher, and the volume average particle size of the particles of the core polymer that was determined using a dynamic light scattering particle measuring apparatus N4 (manufactured by Coulter) was 420 nm. {0082}

$7.5 \times 10^{-5}$ parts of 2-methyl-4-isothiazolin-3-one, and $2.1 \times 10^{-4}$ parts of 5-chloro-2-methyl-4-isothiazolin-3-one were added respectively as preservatives to the aqueous dispersion containing 10 parts of the core polymer, then the aqueous dispersion containing the core polymer with the preservatives added was obtained.

(Formation of Shell Polymer)

8.7 parts of MMA, 1.8 parts of BA, 0.7 parts of MAA, 0.02 parts of sodium polyoxyethylene alkyl ether sulfate, and 17.8 parts of ion exchanged water were placed in a pressure vessel equipped with a stirrer, and were then stirred to prepare an emulsified product of a monomer mixture (b-1) for forming the shell polymer.

Further, 88.3 parts of styrene (ST), 0.6 parts of methacrylic acid (MAA), 0.3 parts of sodium polyoxyethylene alkyl ether sulfate, and 39.5 parts of ion exchanged water were placed in a pressure vessel equipped with a stirrer, and were then stirred to prepare an emulsified product of a monomer mixture (b-2) for forming the shell polymer.

130 parts of ion exchanged water, and the aqueous dispersion containing the core polymer with the preservatives were added to a reaction vessel equipped with a stirrer so that the weight of the core polymer was 10 parts, and were then the reaction vessel was heated to a temperature of 85° C. Next, 10 parts of an aqueous solution containing 4% by weight of potassium persulfate was added. Thereafter, the monomer mixture (b-1) for forming the shell polymer was continuously added to the reaction vessel for 20 minutes for polymerization. After this, the monomer mixture (b-2) for forming the shell polymer was continuously added to the reaction vessel for 120 minutes for polymerization to form a shell polymer that substantially surrounds the core polymer.

(Formation of Void (Base Treatment))

A void was formed using a base by adding 22.5 parts of an aqueous solution containing 5% by weight of ammonia to the reaction vessel, and maintaining the reaction vessel at a temperature of 90° C. for one hour. The pH of the reaction solution was maintained at 7 or more during the one hour.

The reaction system was cooled to a room temperature to obtain an aqueous dispersion containing the hollow polymer particle. The polymerization conversion ratio was 99% or higher.

Storage stability of the aqueous dispersion of the hollow polymer particle was evaluated, and the amount of generated aggregates and the porosity of the hollow polymer particle were measured. The results are shown in Table 1.

Example 2

A similar procedure to Example 1 was followed except that the compositions of the monomer mixture (a) for forming the core polymer and the monomer mixtures (b-1) and (b-2) for forming the shell polymer were changed as shown in Table 1, and that the preservatives added to the aqueous dispersion of the core polymer were changed to $1.5 \times 10^{-4}$ parts of 2-methyl-4-isothiazolin-3-one and $1.5 \times 10^{-4}$ parts of 1,2-benzoisothiazolin-3-one. Storage stability of the aqueous dispersion of the hollow polymer particle was evaluated, and the amount of generated aggregates and the porosity of the hollow polymer particle were measured. The results are shown in Table 1.

Example 3

A similar procedure to Example 1 was followed except that the compositions of the monomer mixture (a) for forming the core polymer and the monomer mixtures (b-1) and (b-2) for forming the shell polymer were changed as shown in Table 1, and that the preservatives added to the aqueous dispersion of the core polymer were changed to $2.0 \times 10^{-3}$ parts of 2-methyl-4-isothiazolin-3-one and $4.0 \times 10^{4}$ parts of 2-n-octyl-4-isothiazolin-3-one. Storage stability of the aqueous dispersion of the hollow polymer particle was evaluated, and the amount of generated aggregates and the porosity of the hollow polymer particle were measured. The results are shown in Table 1.

Comparative Example 1

A similar procedure to Example 1 was followed except that no preservatives were added to the aqueous dispersion of the core polymer. Storage stability of the aqueous dispersion of the hollow polymer particle was evaluated, and the amount of generated aggregates and the porosity of the hollow polymer particle were measured. The results are shown in Table 1.

Comparative Examples 2 and 3

A similar procedure to Example 1 was followed except that the composition of the monomer mixture (a) for forming the core polymer was changed as shown in Table 1. Storage stability of the aqueous dispersion of the hollow polymer particle was evaluated, and the amount of generated aggregates and the porosity of the hollow polymer particle were measured. The results are shown in Table 1.

Comparative Example 4

A similar procedure to Example 1 was followed except that the compositions of the monomer mixtures (b-1) and (b-2) for forming the shell polymer were changed as shown in Table 1. Due to aggregation of the entire quantity during the formation of a void, it was not possible to evaluate storage stability of the aqueous dispersion of the hollow polymer particle, and it was not possible to measure the amount of generated aggregates and the porosity of the hollow polymer particle.

Comparative Examples 5 to 7

A similar procedure to Example 1 was followed except that no preservatives were added to the aqueous dispersion of the core polymer, but the preservatives shown in Table 1 were added to the aqueous dispersion of the hollow polymer particle. Storage stability of the aqueous dispersion of the hollow polymer particle was evaluated, and the amount of generated aggregates and the porosity of the hollow polymer particle were measured. The results are shown in Table 1.

TABLE 1

| | Examples | | | Comparative Examples | | | | | | |
|---|---|---|---|---|---|---|---|---|---|---|
| | 1 | 2 | 3 | 1 | 2 | 3 | 4 | 5 | 6 | 7 |
| Monomer mixture (a) for core polymer [%] | | | | | | | | | | |
| MMA | 50.0 | 60.0 | 45.0 | 50.0 | 65.0 | 35.0 | 50.0 | 50.0 | 50.0 | 50.0 |
| BA | 10.0 | 15.0 | — | 10.0 | 20.0 | — | 10.0 | 10.0 | 10.0 | 10.0 |
| MAA | 40.0 | 25.0 | 55.0 | 40.0 | 15.0 | 65.0 | 40.0 | 40.0 | 40.0 | 40.0 |
| Used amount of core polymer [parts] | 10 | 12 | 8 | 10 | 10 | 10 | 10 | 10 | 10 | 10 |
| Addition amount of preservative after formation of core polymer [parts] | | | | | | | | | | |
| 2-methyl-4-isothiazolin-3-one | $7.5 \times 10^{-5}$ | $1.5 \times 10^{-4}$ | $2.0 \times 10^{-3}$ | — | $7.5 \times 10^{-5}$ | $7.5 \times 10^{-5}$ | $7.5 \times 10^{-5}$ | — | — | — |
| 2-n-octyl-4-isothiazolin-3-one | — | — | $4.0 \times 10^{-4}$ | — | — | — | — | — | — | — |
| 5-chloro-2-methyl-4-isothiazolin-3-one | $2.1 \times 10^{-4}$ | — | — | — | $2.1 \times 10^{-4}$ | $2.1 \times 10^{-4}$ | $2.1 \times 10^{-4}$ | — | — | — |
| 1,2-benzoisothiazolin-3-one | — | $1.5 \times 10^{-4}$ | — | — | — | — | — | — | — | — |
| Monomer mixture for forming shell polymer Monomer mixture (b-1) [%] | | | | | | | | | | |
| MMA | 8.7 | 5.0 | 9.2 | 8.7 | 8.7 | 8.7 | 5.0 | 8.7 | 8.7 | 8.7 |
| BA | 1.8 | 1.0 | — | 1.8 | 1.8 | 1.8 | 1.0 | 1.8 | 1.8 | 1.8 |
| MAA | 0.7 | 4.0 | 0.1 | 0.7 | 0.7 | 0.7 | 8.0 | 0.7 | 0.7 | 0.7 |
| Monomer mixture (b-2) [%] | | | | | | | | | | |
| ST | 88.3 | 86.5 | 90.6 | 88.3 | 88.3 | 88.3 | 74.0 | 88.3 | 88.3 | 88.3 |
| MAA | 0.6 | 3.5 | 0.1 | 0.6 | 0.6 | 0.6 | 12.0 | 0.6 | 0.6 | 0.6 |
| Used amount of monomer mixtures for forming shell polymer [parts] | 90 | 88 | 92 | 90 | 90 | 90 | 90 | 90 | 90 | 90 |
| Addition amount of preservative after formation of hollow polymer [parts] | | | | | | | | | | |
| 2-methyl-4-isothiazolin-3-one | — | — | — | — | — | — | — | $7.5 \times 10^{-5}$ | $1.5 \times 10^{-4}$ | $2.0 \times 10^{-3}$ |
| 2-n-octyl-4-isothiazolin-3-one | — | — | — | — | — | — | — | — | — | $4.0 \times 10^{-4}$ |
| 5-chloro-2-methyl-4-isothiazolin-3-one | — | — | — | — | — | — | — | $2.1 \times 10^{-4}$ | — | — |
| 1,2-benzoisothiazolin-3-one | — | — | — | — | — | — | — | — | $1.5 \times 10^{-4}$ | — |
| Aqueous dispersion of hollow polymer particle | | | | | | | | | | |
| Storage stability | Good | Good | Good | Poor | Poor | Slightly poor | Not evaluable | Slightly poor | Slightly poor | Good |
| Aggregate [%] | 0.015 | 0.024 | 0.037 | 0.386 | 0.158 | 1.409 | Entirely aggregated | 0.402 | 0.441 | 0.436 |
| Hollow polymer particle | | | | | | | | | | |
| Porosity [%] | 53 | 55 | 51 | 47 | 29 | 51 | Not evaluable | 47 | 47 | 47 |

Remarks: Due to rounding, percentages of monomer mixtures may not sum to 100%.

As shown in Table 1, each of hollow polymer particles including a structure body that contains a structure including (1) a core polymer formed by copolymerizing a monomer mixture (a) consisting of 20 to 60% by weight of an acid group-containing monomer and 80 to 40% by weight of another monomer that is copolymerizable with the acid group-containing monomer, and (2) a shell polymer formed by copolymerizing a monomer mixture (b) consisting of 0 to 15% by weight of an acid group-containing monomer and 100 to 85% by weight of another monomer that is copolymerizable with the acid group-containing monomer so that the shell polymer substantially surrounding the core polymer, wherein the structure body has at least one void formed by neutralization of at least one portion of an acid group contained in the core polymer, and the hollow polymer particle is obtained by adding a preservative during a time period after formation of the core polymer and before formation of the shell polymer had a high porosity, and the aqueous dispersion of the hollow polymer particle had high storage stability and a small amount of generated aggregates (Examples 1 to 3).

In contrast, no use of preservatives during the production of a hollow polymer particle resulted in low storage stability of the aqueous dispersion of the hollow polymer particle, a larger amount of generated aggregates, and a slightly low porosity of the hollow polymer particle (Comparative Example 1).

Further, a low content of the acid group-containing monomer in the monomer mixture (a) for forming the core polymer also resulted in low storage stability of the aqueous dispersion of the hollow polymer particle, a larger amount of generated aggregates, and a low porosity of the hollow polymer particle (Comparative Example 2).

Further, a high content of the acid group-containing monomer in the monomer mixture (a) for forming the core polymer resulted in slightly low storage stability of the aqueous dispersion of the hollow polymer particle, and a significantly large amount of generated aggregates (Comparative Example 3).

Further, a high content of the acid group-containing monomer in the monomer mixture (b) for forming the shell polymer caused the entire quantity to aggregate during neutralization, and thus it was not possible to obtain desired aqueous dispersion of the hollow polymer particle (Comparative Example 4).

Further, when no preservatives were added during a time period after formation of the core polymer and before formation of the shell polymer, but preservatives were added to the aqueous dispersion of the hollow polymer particle after production of the hollow polymer particle, results were as follows: The storage stability of the aqueous dispersion of the hollow polymer particle was slightly low; the amount of generated aggregates was large; and the porosity of the hollow polymer particle was slightly low (Comparative Examples 5 and 6).

Further, when no preservatives were added during a time period after formation of the core polymer and before formation of the shell polymer, but preservatives were added to the aqueous dispersion of the hollow polymer particle after production of the hollow polymer particle, and the amounts of the preservatives added were higher than those in Comparative Examples 5 and 6, results were as follows: Although the storage stability of the aqueous dispersion of the hollow polymer particle was now satisfactory, the amount of generated aggregates was large; and the porosity of the hollow polymer particle was slightly low (Comparative Example 7).

The invention claimed is:

1. A method for producing a hollow polymer particle, the method comprising:
   a core polymer formation step of forming a core polymer by copolymerizing a monomer mixture (a) consisting of 20 to 60% by weight of an acid group-containing monomer and 80 to 40% by weight of another monomer that is copolymerizable with the acid group-containing monomer; and subsequently
   a shell polymer formation step of forming a shell polymer by copolymerizing a monomer mixture (b) consisting of 0 to 15% by weight of an acid group-containing monomer and 100 to 85% by weight of another monomer that is copolymerizable with the acid group-containing monomer so that the shell polymer covers the core polymer wherein, the method further comprises
   a step of adding a preservative to an aqueous dispersion including the core polymer, the step of adding a preservative being conducted during a time period after the core polymer formation step and before the shell polymer formation step, and
   a step of forming a void by neutralization of at least one portion of an acid group provided by the acid group-containing monomer used for the formation of the core polymer, the neutralization comprising addition of a base to an aqueous dispersion including a polymer covered with the shell polymer, the step of forming a void being conducted after the shell polymer formation step.

* * * * *